July 24, 1934.  F. I. LIBBEY  1,967,893
BRAKE SYSTEM FOR AUTOMOBILES
Filed June 4, 1930    4 Sheets-Sheet 3
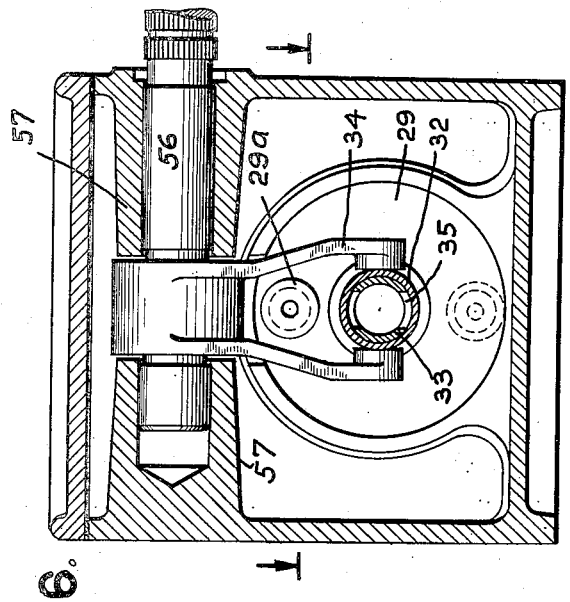
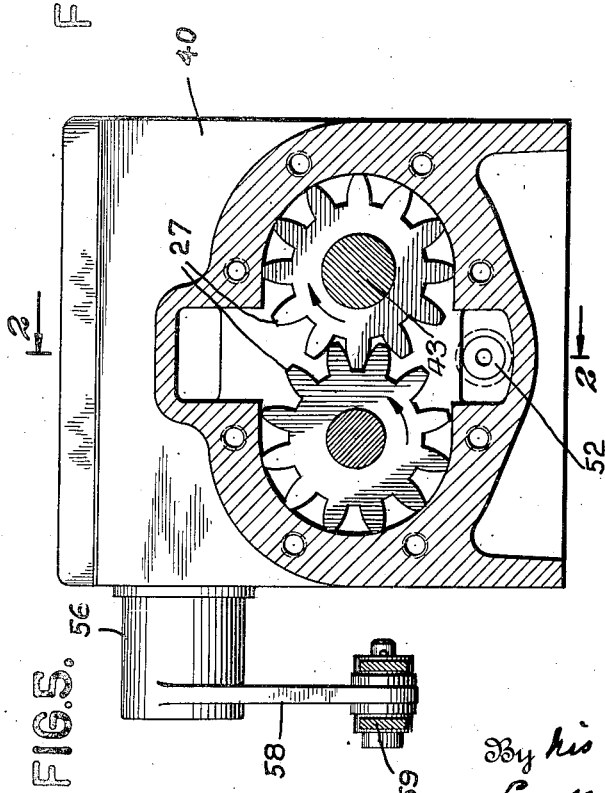
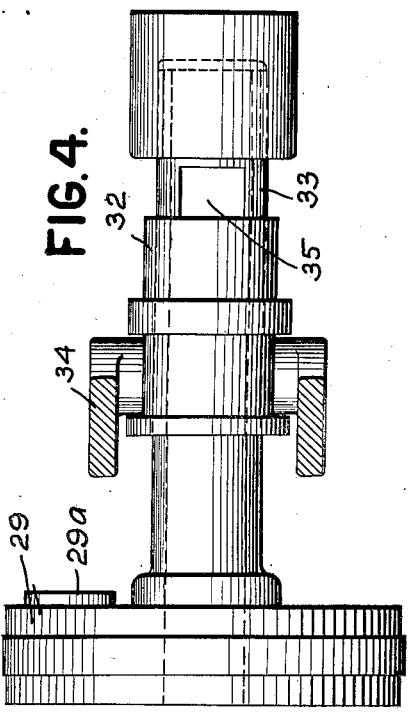
Inventor
Frederick I. Libbey
By his Attorneys
Cooper, Kerr & Dunham

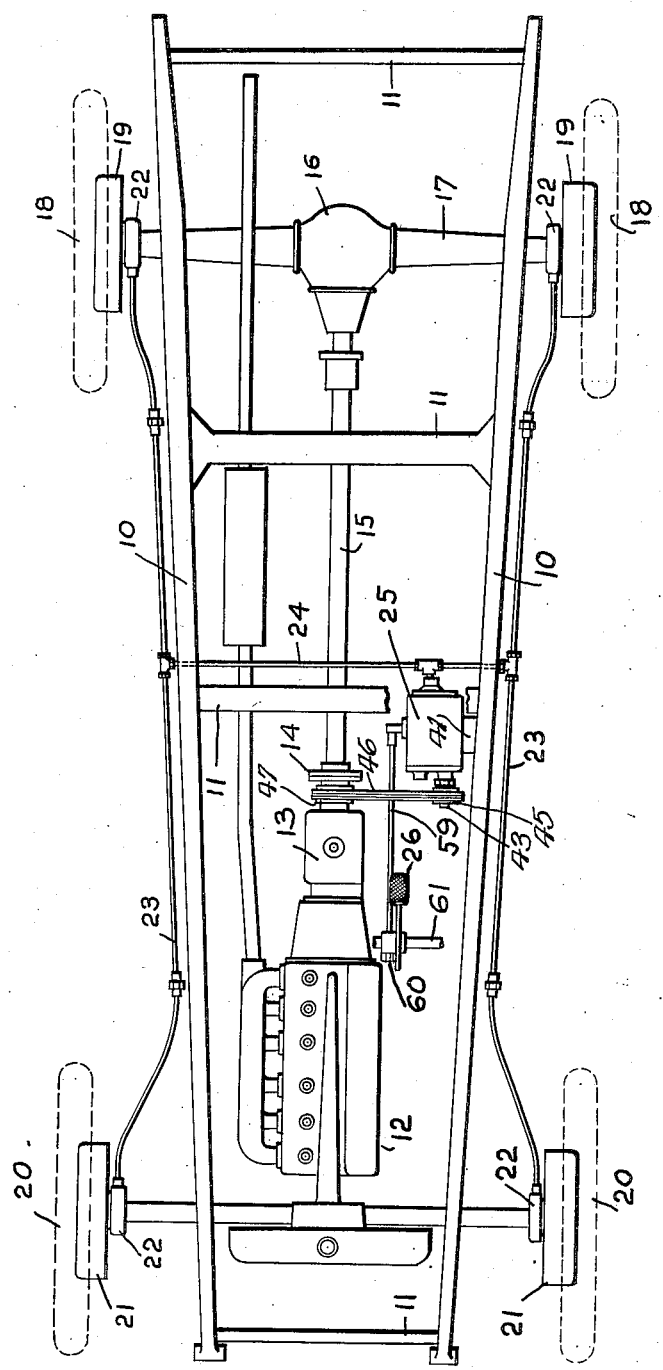

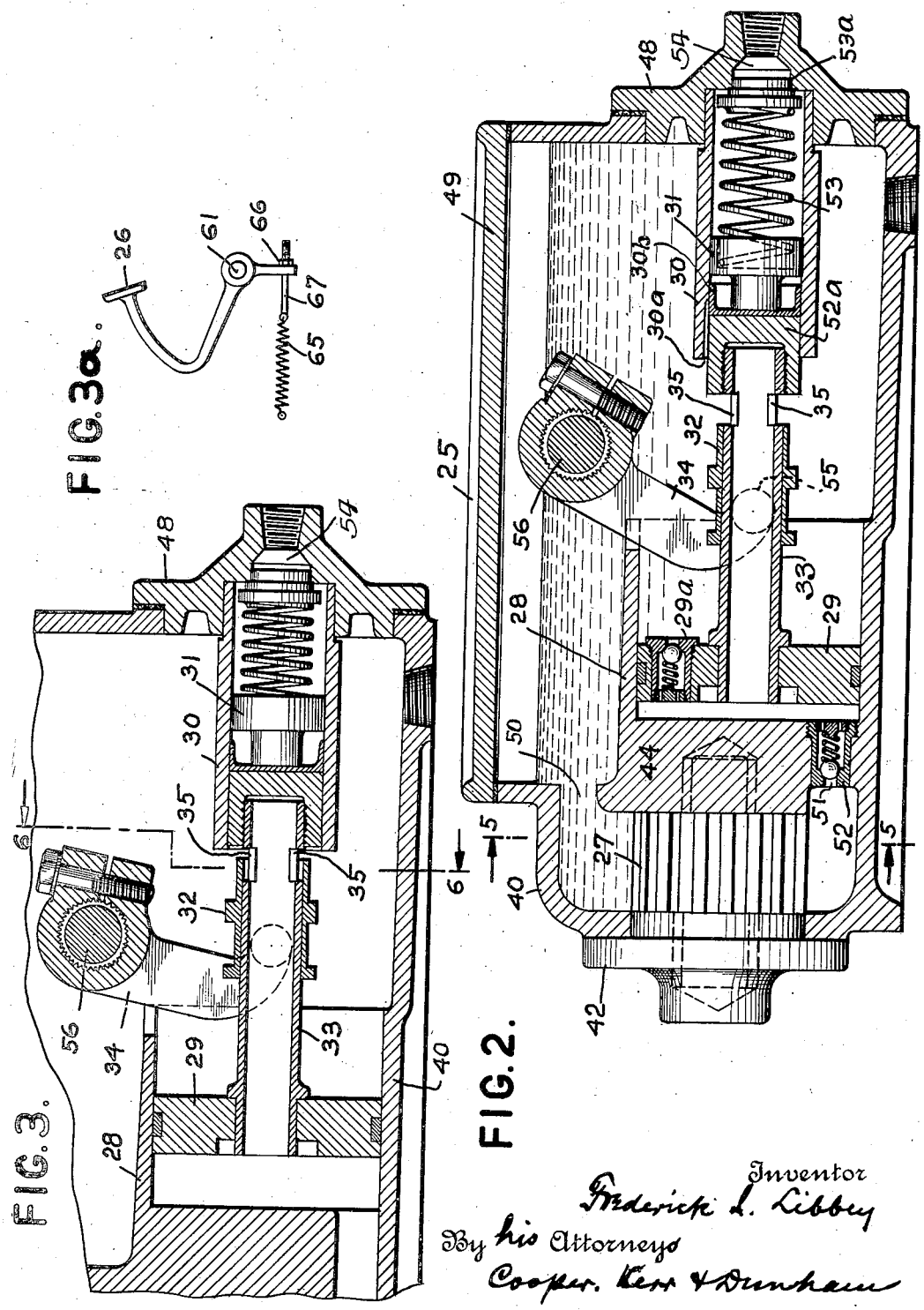

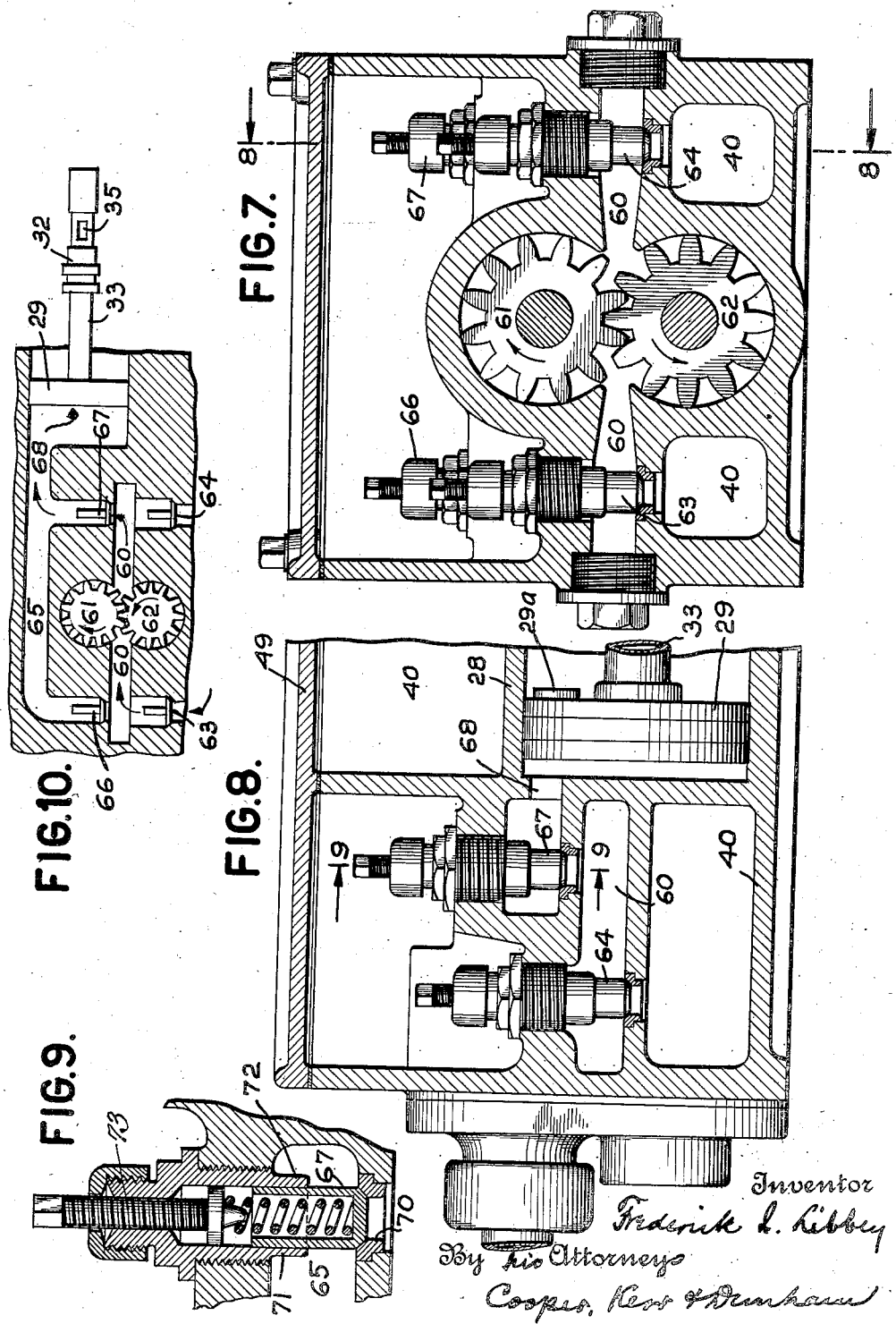

Patented July 24, 1934

1,967,893

UNITED STATES PATENT OFFICE 1,967,893

BRAKE SYSTEM FOR AUTOMOBILES

Frederick I. Libbey, Bronxville, N. Y., assignor to Automatic Brake Corporation, New York, N. Y., a corporation of New York Application June 4, 1930, Serial No. 459,213

7 Claims. (Cl. 60—52)

This invention relates to vehicle brake systems of the class in which the brakes are applied by energy or force derived from the momentum or movement of the vehicle, under the control, however, of the driver or operator; which control, in the case of an automobile, may be conveniently exercised through the medium of the usual pedal.

An important object of the invention is to provide a power brake system which shall possess the advantages of prior power-actuated systems, but without the serious defects which have accompanied such systems in practical use. Another object is to provide a power brake system of the utmost simplicity and ruggedness so that the system can be operated with unfailing reliability for long periods without requiring repairs or adjustment. A further important object is to provide a power unit which can take the place of the so-called master cylinder in foot-actuated hydraulic brakes. To these and other ends the invention comprises the novel features and combinations hereinafter described.

Of the various forms in which my invention can be embodied I have selected for illustration and specific description herein the one that is believed to exhibit the invention in its most convenient form.

Referring now to the accompanying drawings:

Fig. 1 is a plan view of an automobile chassis equipped with my improved power-brake system in its preferred form as outlined above.

Fig. 2 is a longitudinal central section of the hydraulic actuating mechanism on line 2—2 of Fig. 5.

Fig. 3 is a detail section on the same plane as Fig. 2, showing the control valve 32 in an advanced position, partially closing the ports 35.

Fig. 3a is a brake pedal with an adjustable restoring spring.

Fig. 4 is a detail plan view of the power piston 29 and associated parts.

Fig. 5 is a cross section on line 5—5 of Fig. 2, with the gears of the pump in elevation.

Fig. 6 is a cross section on line 6—6 of Fig. 3.

Fig. 7 is a cross section at the plane of the pump, illustrating a modification.

Fig. 8 is a section on line 8—8 of Fig. 7.

Fig. 9 is a detail cross section on line 9—9 of Fig. 8, illustrating the preferred type of valves employed in the structure shown in Figs. 7 and 8.

Fig. 10 is a diagrammatic view showing the arrangement of the passages and valves of Figs. 7 and 8 and their relation to the pump and power cylinder.

In Fig. 1 10, 10 are the side members and 11, 11, 11, 11 are cross members of the frame. The motor is shown at 12, connected by a transmission 13, universal joint 14, propeller shaft 15, differential 16, and rear axle 17 to the driving wheels 18, equipped with brake drums 19. The steering wheels 20 are similarly equipped with drums 21. The internal expanding brakes (not shown) are applied to the drums by hydraulic devices of any suitable type, indicated diagrammatically at 22, connected by piping 23, 24 to the hydraulic actuating mechanism 25 by which liquid under the control of the brake pedal 26 is delivered to the brake-applying devices 22.

Fig. 2 is a longitudinal central section of the hydraulic actuating mechanism, on line 2—2 of Fig. 5, showing the gear pump 27, power cylinder 28, power piston 29, pressure-distributing or transmitting cylinder 30 and piston 31, control valve 32 sliding on the tubular rod 33 of the power piston, and the valve-control arm 34, actuated by the brake pedal to shift the valve on the rod 33 and thereby vary the effective area of the liquid discharge ports 35.

The pump gears 27, piston 29 with its tubular rod 33, the sleeve valve 32, and the pressure distributing cylinder 30 and piston 31 are conveniently housed in a casing 40, mounted on a bracket 41, Fig. 1, carried by one of the side members 10 of the chassis frame. The pump gears 27 are fitted in a pump chamber at an end of the casing, which chamber is closed by a removable head 42 having a bearing for the gear driving shaft 43, suitably packed to prevent leakage of the actuating liquid. This liquid is preferably an oil of suitable body, as for example castor oil. The driven gear is journaled in the head 42 also, and both gears are journaled in the head 44 of the power cylinder 28. The shaft 43 is driven by a sprocket 45, Fig. 1, itself driven by a chain 46 running over a sprocket 47 on the rear shaft of the transmission mechanism, in front of the universal joint 14.

The pressure transmitting cylinder 30 is carried inside of the casing 40, in axial alignment with the power cylinder but spaced therefrom, by a removable head 48, and the top of the casing is closed by a removable cover 49.

The power cylinder 28 is integral with the main body of the casing 40, the head of the cylinder constituting the rear wall of the pump chamber in which the pump gears 27 are located. Above the gears this wall is provided with a port 50 for intake of oil, and below is an outlet port 51 for delivery of oil to the cylinder. In the latter port is a check valve 52 to prevent reverse flow of the oil. The casing being filled with oil (at least up to the intake port 50) it will be seen that when the car is in motion and the gears therefore rotating, the oil is constantly circulated through the inlet port 50, discharge port 51, cylinder 28, piston rod 33, and oil-escape ports 35, so long as the latter are uncovered by the valve 32. The capacity of the ports 35 being at least as great as the pump outlet port 51, it will be seen that practically no pressure will be exerted on the piston 29. If, however, the valve 32 is advanced to cover more or less of the ports 35, the resulting decrease of the rate of escape of the oil will cause pressure to build up correspondingly in the cylinder, thereby advancing the piston and its tubular rod 33. A check valve 29a in the power piston permits oil to flow into the cylinder behind the piston but prevents flow in the opposite direction, as will be readily understood.

At its rear end the piston rod 33 carries a piston head 52a fitting the auxiliary pressure-distributing or transmitting cylinder 30 to reciprocate therein. The cylinder being aligned with the tubular rod 33 the head 52a serves as a guide, keeping the piston 29 perpendicular to the axis of the power cylinder 28. In the auxiliary cylinder the head 52a and tubular rod 33 are urged leftwardly by a helical spring 53, one end of which bears against a ring 53a, seated around the port 54 to which the distributing pipes 24, Fig. 1, are connected. The other end of the spring is seated in a perforated guide 31 sliding in the cylinder. The pipes 23, 24 and the brake-applying devices 22 being filled with oil, it will be seen that the advance of the piston 52a by the power piston 29 and rod 33 will force oil from the cylinder 30 into the piping, and that oil from the latter will in turn be forced into the brake-applying devices, thus actuating the latter and applying the brakes to the drums 19, 21.

The sliding valve 32 is shifted on the tubular piston rod 33 by the forked arm 34, having studs 55 engaging the valve in a circumferential groove. The arm is mounted for rotary adjustment on a rock shaft 56, Fig. 6, mounted in bosses 57 extending inwardly from the side walls of the casing 40. Outside of the casing the shaft carries an arm 58, Fig. 5, connected by a link 59, Fig. 1, to a similar arm 60 on shaft 61 which is rocked by the brake pedal 26.

From the foregoing the operation of the system in use will be readily understood.

The car being in motion forwardly (the gears rotating as indicated by the arrows, Fig. 5), depression of the brake pedal shifts the valve 32 rightwardly, which restricts the escape of oil through the ports 35 and causes the power piston 29 to be advanced, thus applying the brakes as already described. In the conventional foot-actuated brakes, the first part of the movement of the pedal is taken up in bringing the brake bands or brake shoes into contact with the drums. The same is true in the power system illustrated herein, since the ports 35 must be partially covered before the pressure can build up in the power cylinder sufficiently to overcome the tension of the spring 53 and such other spring or springs (not shown) as may be employed to effect disengagement of the shoes from the drums when the braking pressure is relieved As soon as the valve sleeve (shifted by the pedal) has covered the ports 35 enough to cause the piston rod to start, the resulting movement of the rod, being in the same direction as the movement of the sleeve, would uncover the ports again and the rod would cease to advance, but as the pedal is further depressed the valve sleeve follows the ports, keeping them partly closed and thus causing the rod to continue its advance until the brake shoes come into contact with the drums. Thus in the system illustrated, as in the conventional foot-actuated system, the brake shoes keep pace with the pedal in their movement toward the drums. So, also, as the pedal is allowed to rise, the resulting opening of the ports 35 permits more oil to escape from the latter, the piston 29 and rod 33 move back, and the brake shoes move farther from the drums, keeping pace with the upward movement of the pedal. When the shoes come into contact with the drums the advancing movement of the piston rod ceases (except any slight movement permitted by yield of the brake shoe lining), and no further braking pressure is exerted on the drums. If the resulting decrease of the speed of the car is sufficient the operator exerts no further pressure on the pedal, but if he wants further decrease of car speed he simply continues to depress the pedal, just as he would do with brakes of the ordinary foot-actuated type. As the pedal is depressed further, the ports 35 are restricted more and more, the pressure in the power system is correspondingly increased, and the brake shoes are pressed upon the drums with greater and greater force. As the car loses velocity the gears rotate less rapidly, the pressure on the power piston decreases and the piston ceases to advance or may even retreat. If the car begins to increase in speed the pressure builds up again and continues to build up until the resulting increase of pressure balances, as it were, the speed of the car. If the driver desires to stop the car he depresses the pedal farther, causing the pressure to be maintained (as the car speed decreases) at a value sufficient to bring the car to a stop. If at that time the ports are not completely closed, continued depression of the pedal will close them. Backflow of oil being prevented by the check valve, the closing of the escape ports traps the oil in the cylinder 28 and rod 33, with the result that the full braking pressure is maintained until the valve sleeve is retracted by permitting the pedal to rise, thus permitting oil to escape. If the car then starts to move it can be stopped by again depressing the pedal, or if the car does not start to move but the operator nevertheless desires to restore the braking pressure he simply depresses the pedal again. In either case the depression of the pedal first closes the ports 35, then brings the valve sleeve against the head 52a, whereupon further pressure on the pedal advances the head 52a (and piston 29) until the desired braking pressure is restored by the operator's foot. As piston advances, oil is sucked into the cylinder through the check valve 29a, in the piston 29, and thereafter the pressure is maintained as before, by the operator keeping the pedal depressed.

From the above it will be seen that the braking effect follows the operation of the pedal, in the same way as in the conventional foot-actuated brakes, the only difference being that the working pressure is supplied by the momentum of the car as long as the car is moving forwardly and hence the effort which the driver must make may be very light, depending on the tension of the spring or springs which he must overcome to depress the pedal. In order that the brakes may not be too "easy" for an operator accustomed to harder operation the pedal may be equipped with a returning spring the tension of which can be adjusted to suit the user; as in Fig. 3a, for example, in which the tension of spring 65 may be varied by means of the nuts 66 on rod 67. I prefer this method to providing an adjustment for the spring 53.

It will be noted that the simplicity of the power mechanism makes it virtually impossible for anything to get out of order, and since all the parts are immersed in oil, wear is practically eliminated. All openings in the casing can be packed or sealed to prevent or minimize leakage, but if by reason of leakage or other cause the oil level in the casing should fall too low, say below the port 50, Fig. 2, thus making the power mechanism ineffective or even wholly inoperative, the system will operate as a foot-actuated system, the pressure of the pedal being exerted, through the valve sleeve 32 and head 52a, on the piston rod 33.

A groove 30a in the cylinder 30 permits inflow of oil to the cylinder if for any reason a partial vacuum is produced in the cylinder. In such case the gasket 30b, which may be of soft rubber, is drawn in slightly by the vacuum, thus permitting the oil to enter freely until the pressure in the cylinder is restored to normal.

The apparatus illustrated in Figs. 1 to 6 is power-actuated only when the car is moving in one direction, say forward, and when moving in the other direction the brakes are applied by the effort of the operator, but in the modification illustrated in Figs. 7 to 10 rotation of the pump gears in either direction delivers liquid to the power cylinder and hence the power-piston is actuated by the pressure of the liquid when the car is moving backward as well as when moving forward. This operation is provided by suitable automatic valves controlling the flow of liquid to and from the pump, as will now be explained.

Referring to Figs. 7, 8 and 10, reference numeral 60 designates a passage extending across the pump chamber at the plane in which the pump gears 61, 62 mesh with each other. This passage communicates with the casing 40 by way of upwardly opening check valves 63, 64. Above the passage 60 is a transverse passage 65, communicating with passage 60 through upwardly opening check valves 66, 67. A port 68 connects the passage 65 with the power cylinder 28 for delivery of liquid thereto.

When the gears 61, 62 are rotating in the direction of the arrows, Figs. 7 and 10, oil from the casing passes through check valve 63 by the gears and is delivered through check valve 67 to passage 65, whence the oil enters cylinder 28 by way of port 68. If the direction of travel of the car is reversed the gears are rotated in the direction opposite to the arrows in Fig. 7, and the oil then enters passage 60 by way of check valve 64 and enters passage 65 by way of check valve 67, flowing to cylinder 28 through port 68 as in the first case.

The check valves may be of any suitable type but I prefer to construct them as shown in Fig. 9. As there illustrated the valve comprises a cup-shaped member 67 cooperating with a seat 70 and carrying an actuating spring 71. The cup is mounted in a guide 72, which also carries the screw 73 by which the spring can be regulated, as will be readily understood.

The braking operation of the apparatus shown in Figs. 7 to 10 is the same as that of the structure illustrated in Figs. 1 to 6, the check valves 66, 67 serving the same purpose as valve 52.

An important feature of the invention is the assemblage of the operating parts in a single unit, with pressure-multiplying cylinders of different sizes whereby a moderate pressure per square inch in one cylinder may be stepped up to a much higher pressure in the other. Thus with cylinder 28 three inches in diameter (inside) and cylinder 30 one inch in diameter the multiplication is nine times. The relatively low pressure required in the cylinder 28 lessens the possibility of leakage around the piston and also between and around the gears of the pump. The assemblage of the parts in a single unit also makes possible the foot-actuation of the brakes in the manner described, without the undesirable complication of outside linkage with accompanying certainty of wear and exposure to injury.

It is to be understood that the invention is not limited to the forms herein specifically illustrated and described but can be embodied in other forms without departure from its spirit as defined by the following claims.

I claim—

1. A brake-actuating unit for hydraulic brake systems, comprising, in combination, a closed casing for a liquid, a power cylinder of relatively large diameter housed in the casing, a power piston reciprocating in the power cylinder, a vehicle-driven pump for delivering liquid from the casing to the cylinder to actuate the power piston, a check valve permitting flow of liquid from the pump to the power cylinder, a check valve permitting flow of liquid directly from the casing to the power cylinder; valve means permitting flow of liquid from the cylinder to the casing, comprising a member having connection with the power piston and a member adapted to be actuated by the operator; a cylinder of smaller diameter for connection with hydraulically operated brake-actuating devices; and a piston movable in the smaller cylinder by the power piston.

2. A brake-actuating unit for hydraulic brake systems, comprising, in combination, a closed casing for a liquid, a power cylinder housed in the casing, a power piston movable therein, a vehicle-driven gear pump carried by the casing and connected with the power cylinder for delivering liquid thereto from the casing to actuate the power piston, check-valve means permitting flow of liquid to the cylinder from the pump and directly from the casing but preventing reverse flow, a tubular member connected with the power piston for actuation thereby and having a port for the escape of liquid from the cylinder to the casing, an operator-actuated valve-member movable relatively to the tubular member to control the escape of liquid through said port, an hydraulic cylinder of smaller diameter than the power cylinder, and a piston movable therein, associated with the said tubular member and cooperating valve member for actuation thereby.

3. Operator-controlled brake-actuating mechanism for an automobile having a propeller shaft, comprising, in combination, a closed casing for a liquid, a power cylinder inside of the casing, a gear pump receiving liquid from the casing and delivering the liquid to the cylinder, a check valve between the pump and the cylinder to permit flow of liquid from the pump to the cylinder, means for connecting the pump with the propeller shaft of the automobile to drive the pump, a power piston in the cylinder for actuation by liquid therein, a check valve permitting flow of liquid into the cylinder behind the piston directly from the casing and prevent reverse flow of liquid, a piston rod actuated by the piston, a pressure distributing cylinder axially aligned with the piston rod and adapted to contain a liquid, a piston head movable in the auxiliary cylinder and associated with the piston rod for actuation thereby and serving to guide the power piston and rod in the advance and retraction thereof, an auxiliary piston movable in the auxiliary cylinder, a spring in the auxiliary cylinder to maintain the auxiliary piston in engagement with the piston head for actuation thereby, and a valve operable at will to control the pressure of the liquid in the power cylinder.

4. Operator-controlled brake-actuating mechanism for an automobile having a propeller shaft, comprising, in combination, a closed casing for a liquid, a power cylinder inside of the casing, a gear pump to receive liquid from the casing and deliver the same to the cylinder at a rate varying with the speed of the automobile, a check valve between the pump and the cylinder to permit flow of liquid from the pump to the cylinder, means for connecting the pump with the propeller shaft of the automobile to drive the pump, a check valve permitting flow of liquid directly from the casing into the cylinder but preventing reverse flow, a power piston in the cylinder for actuation by liquid therein, a tubular piston rod actuated by the piston and opening therethrough into the cylinder to receive liquid from the cylinder and having a port for escape of fluid so received, an auxiliary cylinder for a liquid, an auxiliary piston movable in the auxiliary cylinder and associated with the tubular piston rod for actuation thereby, a spring in the auxiliary cylinder to maintain the auxiliary piston in association with the auxiliary piston for actuation thereby, a sliding valve sleeve on the tubular piston rod to cooperate with the port therein and thereby control the escape of liquid from the power cylinder through the said port, an arm connected with the valve sleeve to shift the same on the tubular piston rod and adapted to move the sleeve into cooperation with the said piston head to advance the latter.

5. Operator-controlled brake-actuating mechanism for an automobile having a propeller shaft and brake pedal, comprising, in combination, a closed casing for a liquid, a power cylinder inside of the casing, a gear pump receiving liquid from the casing and delivering the same to the cylinder, a check valve between the pump and the cylinder to permit flow of liquid to the cylinder, means for connecting the pump with the propeller shaft of the automobile to drive the pump, a check valve permitting flow of liquid into the cylinder directly from the casing, a power piston in the cylinder for actuation by liquid therein, a tubular piston rod actuated by the piston and opening therethrough into the cylinder to receive liquid from the cylinder and having a port for escape of liquid so received, an auxiliary cylinder adapted to contain a liquid and aligned with the tubular piston rod, an auxiliary piston movable in the auxiliary cylinder and associated with the tubular piston rod for actuation thereby, a sliding valve sleeve on the tubular piston rod to cooperate with the port therein and thereby control the escape of liquid from the power cylinder through the said port, an arm connected with the valve sleeve to shift the same on the tubular piston rod and adapted to move the sleeve into cooperation with the said piston head to advance the latter, said arm being adapted for connection with the brake pedal of the automobile for actuation thereby.

6. Operator-controlled brake-actuating mechanism for an automobile having a propeller shaft and brake pedal, comprising, in combination, a closed casing for a liquid, a power cylinder inside of the casing, a gear pump receiving liquid from the casing and delivering the same to the cylinder, a check valve between the pump and the cylinder to permit flow of liquid from the pump to the cylinder, said pump being adapted to be driven from the propeller shaft of the automobile, a power piston in the cylinder for actuation by liquid therein, a check valve in the piston to permit flow of fluid into the cylinder behind the piston, a tubular piston rod actuated by the piston and opening therethrough into the cylinder to receive liquid from the cylinder and having a port for escape of liquid so received, an auxiliary cylinder adapted to contain liquid and axially aligned with the tubular piston rod, a piston head movable in the auxiliary cylinder and associated with the tubular piston rod for actuation thereby and serving to guide the power piston and rod in the advance and retraction thereof, an auxiliary piston movable in the auxiliary cylinder, a spring in the auxiliary cylinder to maintain the auxiliary piston in engagement with the piston head for actuation thereby, a sliding valve sleeve on the tubular piston rod to cooperate with the port therein and thereby control the escape of liquid from the power cylinder through the said port, an arm connected with the valve sleeve to shift the same on the tubular piston rod and adapted to move the sleeve into cooperation with the said piston head to advance the latter, said arm being adapted for connection with the brake pedal of the automobile for actuation thereby.

7. In a brake system for motor vehicles, an hydraulic power unit comprising a closed casing containing a liquid; a power cylinder immersed in the liquid and having an end wall provided with a passage for liquid, the other end of the cylinder being open to the casing; a gear pump comprising gears housed between the end wall of the cylinder and a wall of the casing to deliver liquid under pressure to the cylinder through said passage; a piston in the cylinder to be advanced by liquid pressure; a tubular piston rod fixed to the piston, open to the cylinder on the pressure side of the piston and provided with a port on the low pressure side thereof inside of the casing for circulation of liquid wholly within the casing; a valve slidably mounted on the piston rod to cooperate with said port; an operator-operable rock-shaft extending into the casing; and an arm mounted on the shaft inside of the casing and connected with the valve to actuate the same.

FREDERICK I. LIBBEY.